United States Patent [19]

Yoneyama et al.

[11] 4,274,726
[45] Jun. 23, 1981

[54] AUTOMATIC FILM WINDER FOR CAMERA

[75] Inventors: Saburo Yoneyama, Akikawa; Minoru Yamada, Hachioji; Yasutsugu Nakagawa, Tokyo; Shizuo Ishii, Tokyo; Masao Kamio, Tokyo, all of Japan

[73] Assignee: Konishiroku Photo Industry Co., Ltd., Tokyo, Japan

[21] Appl. No.: 154,571

[22] Filed: May 29, 1980

[30] Foreign Application Priority Data

Jun. 1, 1979 [JP] Japan .................. 54-69240

[51] Int. Cl.³ .................. G03B 1/04; B65H 75/28
[52] U.S. Cl. .................. 354/173; 242/71.1; 354/212
[58] Field of Search ............ 354/275, 202, 203, 212, 354/213-216, 288, 173; 242/71, 71.1, 74, 74.2

[56] References Cited

U.S. PATENT DOCUMENTS

| 1,386,617 | 8/1921 | Gunderman | 242/74 |
| 1,930,144 | 10/1933 | Lee | 242/74 |
| 2,741,168 | 4/1956 | Schreiber | 242/71 |
| 2,989,906 | 6/1961 | Rentschler | 242/71 X |
| 3,002,438 | 10/1961 | Trow | 354/203 |
| 3,484,053 | 12/1969 | Rehn et al. | 242/74 |
| 3,567,147 | 3/1971 | Engelsmann et al. | 242/71.1 |

FOREIGN PATENT DOCUMENTS 1325437 3/1963 France ..................... 354/173

OTHER PUBLICATIONS

I.B.M. Technical Disclosure Bulletin, vol. 12, No. 8, Jan. 1970, p. 1305.

Primary Examiner—Donald A. Griffin
Attorney, Agent, or Firm—James E. Nilles

[57] ABSTRACT

An automatic film winding device for camera comprising the film winding member of which the outer peripheral portion at one end is formed larger in diameter than the other outer peripheral portion. The automatic film winding device for camera comprises a pressing means mounted on a camera body for pressing the narrowed leading end of the film against the outer peripheral surface of the film winding member at the position where the leading end of the film is received into the film winding chamber. The pressing means is so set that its pressing position corresponds to a part of the cut edge of the narrowed leading end portion of the film, and mounted on the inner surface of a back cover and urged by spring means so as to be capable of pressing the leading end of the film to the film winding member in the winding operation.

23 Claims, 3 Drawing Figures

F I G. 1
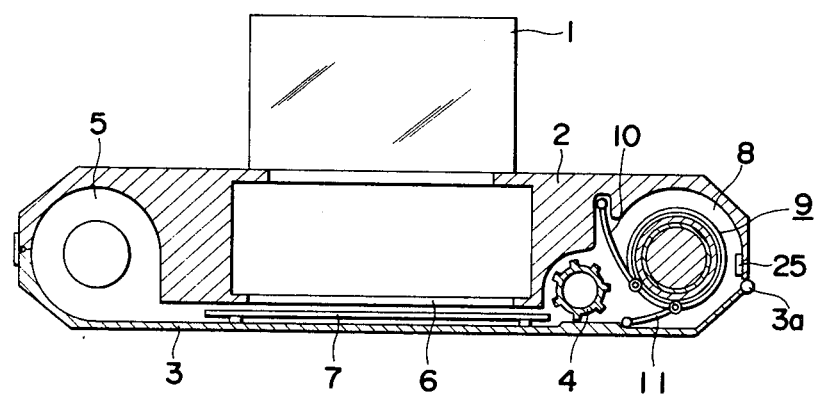
F I G. 2
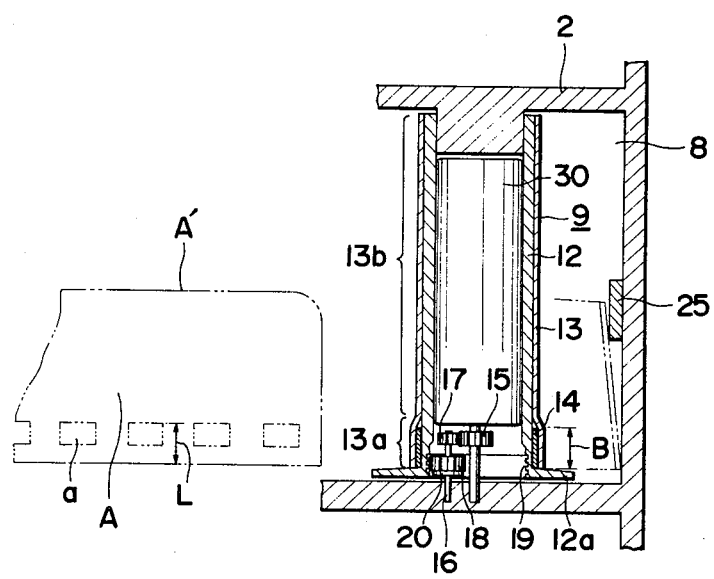

AUTOMATIC FILM WINDER FOR CAMERA

BACKGROUND OF THE INVENTION

1. Field of the Invention

This invention relates to an automatic film winder for camera, and more particularly it relates to the improvements in the automatic film winder of the type in which the film end is wound up on a spool by dint of a frictional force alone.

2. Description of the Prior Art

Among the known automatic film winders of this type is a device in which when loading a film cartridge in the camera by opening its back cover, the film end (in most cases the narrowed leading end of the film) slightly projecting from the cartridge is placed on a sprocket and then, after closing the back cover, the ordinary film winding operation is performed to wind up the film on the spool. According to this system, the film with the perforations at the narrowed leading end thereof being engaged with the projections on one side of the sprocket is moved toward the spool side with the sprocket rotation effected by the film winding operation, and at a point where the narrowed leading end of the film has just contacted the external surface of the spool, a frictional force is produced between the film and the external surface of the spool to thereby wind up the end of the film on the spool.

The matters of primary concern for this type of automatic film winders, that is, the shape and size of the narrowed leading end of the commercial films, particularly 35 mm perforated films, film withdrawal load, etc., vary slightly from the products of one maker to those of the other maker, and it was found as a result of experiments that such variance gives a delicate influence to the automatic film winding performance, in other words, the condition of winding of the film.

Regarding the condition of winding of the film, it is required that when the narrowed film end is wound up on the spool, the film is delivered in such a manner that the edge thereof will advance on a linear track decided by the rail position at the exposure aperture and the position of the sprocket projections (such linear track being hereinafter referred to as ideal linear track) and the end face of the film laminate on the spool will be always positioned on said ideal linear track regardless of the volume of film wound up, and that the film is wound up closely on the peripheral surface of the spool. This is not merely a matter required for the automatic film winding mechanism alone; it is a general principle applied to the film winding on a spool. However, when the narrowed leading end of the film is actually fed to the spool side with the sprocket rotation, it is often experienced that the film end tends to stray from said ideal linear track, that is, when the film is loaded in the camera, the film is fed slightly aslant upwardly in case the narrowed leading end is formed on the lower side of the film as usual.

When this occurs, there is induced a phenomenon of "loose winding", that is, when the narrowed film end has just made a round of the spool, the tip of said film end bites into the succeeding perforation and a loop with a greater diameter than the spool is formed. There may also take place a so-called "bamboo shoot phenomenon" in which the narrowed leading end of the film is coiled spirally on the spool just like the surface of a bamboo shoot.

"Loose winding" leads to serious troubles, that is, when the film is wound up to a certain roll diameter, the external surface of the film roll presses against the inner wall of the film chamber to make any further winding impossible. Also, rewinding of the film becomes awkward or "heavy" to perform, and this may result in severance of the film. The "bamboo shoot phenomenon" causes the film being wound up to be forcibly biased to one side to produce a "local stretched state". This may not only make any further film winding impossible but may also cause break of the perforations in the film. Also, rewinding of the film is resisted to cause cutting of the film in the worst case.

Methods have been proposed for preventing such phenomena. For example, Japanese Utility Model Application Publication No. 41,378/1977 shows a method according to which a taper is formed on the inner wall surface of the film winding chamber and a friction member is rotated along such taper wall surface to thereby attain the intended object.

Such method, however, is unsuited for adaptation to the cameras of the latest models which have an advanced extent of compactness and lightweight. For example, formation of a taper on the inner wall surface of the film winding chamber means formation of a thick-walled portion and a thin-walled portion of the wall of the film winding chamber, and since the gradient required for preventing said loose winding and bamboo shoot phenomenon may reach close to about 3 degrees, the difference between said thin-walled portion and thick-walled portion is not small. This poses a problem on relation of mechanical strength between said thick-walled and thin-walled portions when designing a camera with maximum compactness and lightweight. If the camera is designed to provide sufficient strength to the thin-walled portion, then overmuch strength will be given to the thick-walled portion, while if designing is made by giving preferential consideration to the strength of the thick-walled portion, then the thin-walled portion may become insufficient in strength. This problem is conspicuous when the camera body is made from plastic molding. Also, such problem is not limited to the film winding chamber; it also arises when a tapered thin-walled cylindrical member or members are used in the film winding chamber.

On the other hand, for adapting a friction member so as to be rotatable along the taper surface, it is required to form the inner wall surface of the film winding chamber cylindrically or to make an arrangement such as to allow displacement of the friction member in the radial direction. This greatly limits the degree of freedom in designing of a compact and lightweight camera.

In order to solve these problems, the present inventors have previously proposed a device featuring formation of a convexity or preparation of the protrusion member at a part of the inner wall surface of the film winding chamber, whereby the plane of the narrowed leading end of the film is slanted relative to the axis of the film winding member by making use of the level difference between said convexity and the inner wall surface so that the advancing direction of the narrowed film end will be thereafter oriented aslant downwardly. According to this device, however, for the reasons that said convexity is in many cases formed close to the film receiving position of the film winding chamber and that the narrowed leading end of the film is always given an upward force by the projections on one side of the sprocket, there is a possibility that the advancing direction of the film be changed upwardly in the course of advancement of the film end till it reaches close to said film receiving position after making a round of the film winding member. Therefore, it is required first of all to eliminate such possibility.

Since said regulation on the advancing direction of the narrowed leading end of the film in the course of its movement round the film winding member is attained by slanting the plane of the narrowed leading film end relative to the axis of the film winding member as said before, it is matter-of-factly desired to effectuate said film plane slanting more positively and surely.

SUMMARY OF THE INVENTION

The present invention has been deviced with the object of solving these problems, and the novel feature of this invention resides in that a convexity for slanting the plane of the narrowed leading end of the film is provided on the inner wall of the film winding chamber so as to regulate the film advancing direction by means of said convexity while the film end makes a round of the film winding member, and as regards the film portion contacting the external surface of the film winding member when advancing into the film winding chamber and the film portion contacting the external surface of the film winding member when overlapping with the succeeding film portion after a round of said film winding member, the film advancing direction is regulated by a large-diameter portion formed at an end of said film winding member.

BRIEF DESCRIPTION OF THE DRAWINGS

FIG. 1 is a sectional view of a 35 mm camera adapted with the device of this invention;

FIG. 2 is an enlarged sectional view of the principal parts of said camera; and

DETAILED DESCRIPTION OF THE PREFERRED EMBODIMENT

Figure 3:
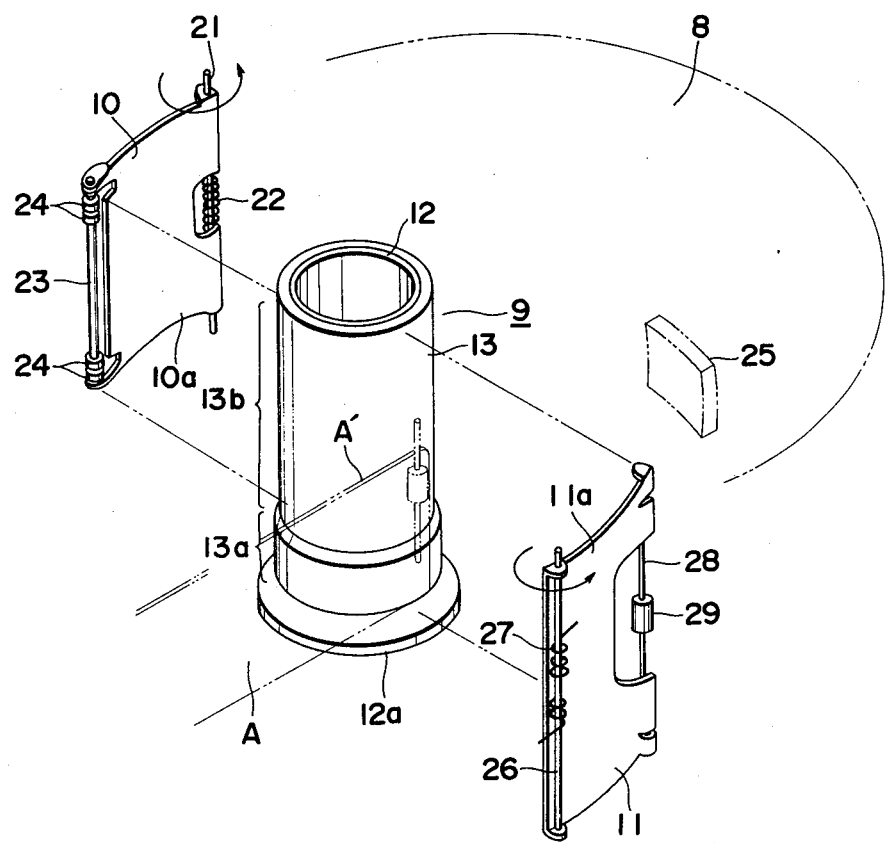
FIG. 3 is an exploded perspective view of the automatic film winder according to this invention.

Referring to FIG. 1, there is shown a sectional view of an auto-loading 35 mm camera comprising a photographing lens 1, a camera body 2, a cover 3 arranged to be openable at one end as its other end (right end in the drawing) is hinged at 3a, and a sprocket 4. The narrowed leading end A of the film rolled in a film cartridge housed in a cartridge chamber 5 is delivered a predetermined length at one time by the sprocket 4 into the film winding chamber 8 after passing the space between an exposure aperture 6 and a pressing plate 7 and wound up by an automatic film winder disposed in the winding chamber 8.

The automatic film winder includes a cylindrical film winding member 9 rotatably supported in the camera body 2, pressing means 10, 11 adapted to press the narrowed leading end A of the film against the peripheral surface of said film winding member 9, and a protuberant piece 25 bonded to a part of the inner wall surface of the film winding chamber 8.

The film winding member 9 comprises an inner cylinder 12 made of a rigid material such as metal and having a flange 12a and an outer cylinder 13 made of a highly frictional elastic material such as neoprene, butadiene rubber, etc., with a hardness of about 40 to 50 degrees and attached tightly to the outer periphery of said inner cylinder 12.

The end portion 13a of said outer cylinder 13 provided in the vicinity of the flange 12a is greater in diameter than the other portion 13b (the difference in diameter being about 0.2-0.4 mm). More definitely, a double-coated adhesive tape 14 of a predetermined thickness (for example about 0.2-0.4 mm) is attached to the external surface at an end of the inner cylinder 12 and said both inner cylinder 12 and double-coated adhesive tape 14 are sheathed by a rubber cylinder, or outer cylinder 13, of a uniform thickness. Preferably, the width B of the large-diameter end portion 13a of the outer cylinder 13 is smaller than the distance L from the edge of the narrowed leading end of the film to the edge of the corresponding perforation a remoter from said film edge.

Said film winding member 9 is driven by a DC motor 30 disposed concentrically in the inner cylinder 12. On the output shaft of said DC motor 30 is carried a pinion 15 meshed with a gear 17 on a shaft 16 rotatably set in the camera body 2, and a driving gear 18 loosely mounted on said shaft 16 is meshed with an internal gear 19 on the inner cylinder 12. As the rotational torque is transmitted to said driving gear 18 from a friction disc 20 provided on the shaft 16, the film winding member 9 is driven to rotate at a reduced speed. Said inner cylinder 12 and the casing structure for the motor 30 may be formed integral with each other. As for the relation between the sprocket 4 and film winding member 9, said both members are in an interlocked relation so that they are operated correspondingly to each other by means of a suitable gear train therefor, and the speed ratio thereof is preferably so set that the ratio of the peripheral speed of the sprocket 4 (film feed) to the peripheral speed of the film winding member 9 (volume of film wound up in the first round) will be 1 to 1.3-2.0.

On the other hand, the pressing means 10 for effecting overlapping of the film, which is disposed in the film winding chamber 8 and pivotally supported at its base portion to the camera body 2 by a shaft 21, is always urged in the direction of arrow by a spring 22 as shown in FIG. 3. Said pressing means 10 also carries at its end a metal-made shaft 23 and rollers 24 formed integral at both ends thereof. Said rollers 24 serve as the actual pressing members and the interior side of a plate member rotatably supporting said rollers provides a curved guide face 10a. As for the position of said rollers 24 relative to the film width, said rollers are so set that they are positioned outside of either side of the film including the perforations therein. In this case, the rollers 24 on the lower side contact the large-diameter portion of the film winding member 9 to produce theoretically a condition where only these lower rollers alone attach to the film winding member 9, but this poses no problem in actual use. Another pressing means 11 adapted for receiving the film and pivotally supported at its base portion by a shaft 26 set in the back cover 3 is always urged in the direction of arrow by a spring 27 and carries at its end a rotatable metallic shaft 28 and a rubber roller 29 mounted thereon. When no film is loaded, the rubber roller 29 alone presses against the outer peripheral surface of the film winding member 9 to actually serve as pressing member, and the interior side 11a of the plate member rotatably supporting the metallic shaft 28 at its both ends serves as a curved guide plane for the narrowed leading end A of the film. Thus, the leading end A of the film delivered by the sprocket 4 is forcibly guided by said curved surface 11a to the outer peripheral surface of the film winding member 9 and is held between said outer peripheral surface and said rubber roller 29. The contact point between said rubber roller 29 and film winding member 9 is set close to the point at which the end of the film delivered by the sprocket 4 first contacts the outer peripheral surface of the film winding member 9 in a natural way, and the contact point between the rollers 24 of the pressing means 10 and the outer peripheral surface of the film winding member is preferably set at a position where the film end oriented by the inner wall surface of the film winding chamber 8 and the curved guiding face 10a of the film pressing means 10 will be naturally directed toward the outer peripheral surface of the film winding member 9. This invention, however, is not limited by such arrangement. It is to be noted that the forces of the springs 22 and 27 are so set that the pressing force of the pressing means 10 will be greater than that of another pressing means 11.

The film winding chamber 8, as shown in FIG. 2, is so constructed that its inner wall surface will be parallel to the axis of rotation of the film winding member 9, and a plate-like protuberant piece 25 with a thickness of for example about 1 mm is bonded at a position where the tip of the narrowed leading end of the film which is disposed between the outer peripheral surface of the film winding member 9 and the rubber roller 29 and advanced by describing a curved track first contacts the inner wall surface of the film winding chamber 8 and which also corresponds to a position close to the cut edge A' of said narrowed film end A. This protuberant piece 25 may be made of any known material having a shape and quality which won't damage the foremost end of the film and its back side, for example a synthetic resin material such as Moltoprene (Sold under the trade name of Bayer, West Germany) may be used. The thickness of said protuberant piece 25 is selected such that the narrowed leading end A of the film will be slanted relative to the inner wall surface of the film winding chamber as shown in FIG. 3 so that it will advance thereafter along the aforesaid ideal linear track or in the direction somewhat aslant downwards thereof. As for the size of said piece 25, it may be about 5 mm in width and about 10-15 mm in length.

The illustrated embodiment of this invention is constructed as described above, so that the narrowed leading end A of the film which advanced into the film winding chamber 8 while held between the outer peripheral surface of the film winding member 9 and the rubber roller 29 of the film pressing means 11 and describing a curved track moves along the inner wall surface of the film winding chamber while slanting as shown in FIG. 3 as the back side of the film attaches against said protuberant piece 25 and turns round the film winding member 9 while oriented aslant downwardly, and upon reaching the pressing means 10, the tip of the narrowed leading end of the film is again guided to the outer periphery of the film winding member 9 by the curved guide face 10a of said means 10 so that the narrowed leading end A of the film is caught and held in between the rollers 24 and said outer periphery of the film winding member 9. The tip of the narrowed leading end of the film further advances under a strong pressing force of the rollers 24 to impinge against the inner side of the succeeding film portion, that is, the film portion (which is still narrow in width) placed between the sprocket 4 and the film winding member 9 and then is further guided along the inner side of said film portion to reach the contact point between the rubber roller 29 of the pressing means 11 and the outer periphery of the film winding member 9. In this case, owing to the aslant downward action of said protuberant piece 25, there is no fear that the film tip should get into a perforation in the succeeding film portion or advance spirally like a bamboo shoot. Also, because the pressing force exerted to the rollers 24 by the pressing means 10 is greater than the pressing force of the rubber roller 29 of another pressing means 11, the tip of the narrowed leading end A of the film which has just turned round the film winding member 9 can further advance in between the succeeding film portion and the film winding member 9 by overcoming the pressing action of the rubber roller 29.

Because the peripheral speed of the film winding member 9 is higher than that of the sprocket 4 and also because the friction-producing force of the outer peripheral surface of the film winding member is greater than that between the rubber roller 29 and the film surface, the advancing speed of the film portion (tipmost portion of the narrowed leading end of the film) on the inside directly contacting the outer peripheral surface of the film winding member becomes higher than the delivery speed of the succeeding film portion positioned outside of the first-said film portion, so that the narrowed leading end A of the film moving round the film winding member 9 is gradually attached fast to the outer peripheral surface of the film winding member 9. Thus, "close winding" is provided. In this case, since an end portion 13a (for example, about 4 mm from the end) of the film winding member 9 is slightly greater in outer diameter than the other portion 13b, the narrowed leading end A of the film which is being "closely wound" has a tendency to displace to the larger-diameter portion 13a side as in the case of an ordinary medium-sized pulley. This, coupled with the presence of the flanges 12a, allows the end face of the narrowed leading end A of the film to position on said ideal linear track. Therefore, the so-called "bamboo shoot phenomenon" can be perfectly prevented. In the shown embodiment, the rubber roller 29 of the pressing means 11 on the film receiving side is positioned close to the cut edge (substantially half of the full width of the film) of the narrowed leading end portion A of the film. This proves convenient for bringing the lower end of said narrowed film portion into natural contact with the large-diameter portion 13a. It also facilitates slanting of the narrowed leading end portion of the film by said protuberant piece 25 to prevent occurrence of the bamboo shoot phenomenon. These means, however, are not essential. For instance, rubber roller 29 may be provided at both ends of the shaft 28 like the rollers 24 of the pressing means 10.

After the narrowed leading end A of the film has been wound tightly on the film winding member 9, the film is wound on said member 9 frame by frame successively with the film movement being controlled by the rotation of the sprocket 4. The difference in peripheral speed between the sprocket 4 and film winding member 9 is corrected by the sliding action of said friction disc 20 in the shown embodiment, but other means may be used for such purpose. Also, in the shown embodiment, a sprocket is used for feeding the film, but in some cases as when using a film with no perforation, a frictional roller means may be employed. Arrangement may be also made such that the narrowed leading end of the film is previously drawn out by the fingers to the position of the film-receiving pressing means and then the cover is closed so that the narrowed leading end of the film will be automatically wound up only by rotation of the film winding member. Further, in case it is not required to adopt an automatic winding system in which the film is wound up automatically with the back cover of the camera closed, the film-receiving pressing means may be provided on the camera body side so that, with the back cover opened, the film end may be brought to the film winding member side by the fingers, said back cover being closed after making sure that the narrowed leading end of the film has been dully wound on the film winding member.

Needless to say, in case the narrowed leading end of the film is wound on the film winding member by a motor operation, there may be incorporated a so-called means for multiple-frame advancement of film without exposure, which allows continuous winding of the first several frames.

Said protuberant piece 25 may not necessarily be of a bonded type as in the shown embodiment; it may be formed integral with the film winding chamber and a hard material such as metal may be used therefor. It is also not essential that the inner wall surface of the film winding chamber be parallel to the axis of the film winding member; in some cases, said inner wall surface may be tapered and said protuberant piece may be bonded.

As described above, use of this invention has the effect of allowing very accurate winding of the narrowed leading end of the film on the film winding member.

This invention can be applied to an automatic winder in which the narrowed leading end of the film is positioned above the camera in the drawings, but in this case, said ideal linear track is positioned on the upper side. In case of providing the film-receiving pressing means on the camera body side, the shaft of the rubber roller may be disposed at the middle point between the pivotal shaft of the plate member and its freely movable end while providing the curved guide face in the area from said point to the freely movable end.

This invention can well produce its effect in its adaptation to a manual film winding mechanism, but even better effect is provided when it is adapted to a motor-driven film winding system.

What is claimed is:

1. An automatic film winding device for camera, and said camera having therein a film winding chamber for containing a roll of film of the type in which the leading end of the film is wound on a film winding member by dint of a frictional force, a sprocket disposed at the entrance of said film winding chamber including said film winding member, gear trains for connecting said film winding member and said sprocket, the peripheral speed of said film winding member being larger than that of said sprocket, improvement of the device which comprising the film winding member of which the outer peripheral portion at one end is formed larger in diameter than the other outer peripheral portion, said member including a flange formed at said larger diameter end.

2. The automatic film winding device for camera according to claim 1, wherein the device further comprising a pressing means mounted on a camera body for pressing the narrowed leading end of the film against the outer peripheral surface of the film winding member at the position where the leading end of the film is received into the film winding chamber.

3. The automatic film winding device for camera according to claim 2, wherein the pressing means is so set that its pressing position corresponds to a part of the cut edge of the narrowed leading end portion of the film.

4. The automatic film winding device for camera according to claim 3, wherein the pressing means is mounted on the inner surface of a back cover, substantially, and urged by spring means so as to be capable of pressing the leading end of the film to the film winding member in the winding operation.

5. The automatic film winding device for camera according to claim 2, wherein the pressing means is a rubber roller.

6. The automatic film winding device for camera according to claim 1, wherein the outer peripheral surface portion of the film winding member is made of a highly frictional elastic material with a hardness of about 40 to 50 degrees.

7. The automatic film winding device for camera according to claim 1, wherein the width of the large-diameter end portion of the film winding member is smaller than the distance from the edge of the narrowed leading end of the film to the edge of the corresponding perforation remotor from the film edge.

8. The automatic film winding device for camera according to claim 1, wherein the device further comprising other pressing means mounted on a camera body and urged by spring means so as to be capable of pressing the leading end of the film to the film winding member in the winding operation.

9. The automatic film winding device for camera according to claim 8, wherein the pressing force of the other pressing means is greater than that of the one pressing means.

10. The automatic film winding device for camera according to claim 1, wherein each of the pressing means is provided integrally with a film guide face.

11. An automatic film winding device for camera, said camera having therein a film winding chamber for containing a roll of film, a film winding motor with an output shaft disposed in said film winding member, a sprocket disposed at the entrance of said film winding chamber including said film winding member, gear trains for connecting said output shaft of said motor with said film winding member and said sprocket, the peripheral speed of said film winding member being larger than that of said sprocket, of the type in which the leading end of the film is wound on a film winding member by dint of a frictional force, improvement of the device which comprising the film winding member of which the outer peripheral portion at one end is formed larger in diameter than the other outer peripheral portion, and a protuberance provided on the inner wall surface of the film winding chamber for slanting the plane of the narrowed leading end of the film relative to the axis of the film winding member, wherein the leading end of the film advancing into the film winding chamber is guided by the protuberance, said film winding member including a flange formed at said larger diameter end.

12. The automatic film winding device for camera according to claim 11, wherein the device further comprising a pressing means mounted on a camera body for pressing the narrowed leading end of the film against the outer peripheral surface of the film winding member at the position where the leading end of the film is received into the film winding chamber.

13. The automatic film winding device for camera according to claim 12, wherein the pressing means is so set that its pressing position corresponds to a part of the cut edge of the narrowed leading end portion of the film.

14. The automatic film winding device for camera according to claim 12, wherein the pressing means is a rubber roller.

15. The automatic film winding device for camera according to claim 11, wherein the outer peripheral surface portion of the film winding member is made of a highly frictional elastic material with a hardness of about 40 to 50 degrees.

16. The automatic film winding device for camera according to claim 11, wherein the width of the large-diameter end portion of the film winding member is smaller than the distance from the edge of the narrowed leading end of the film to the edge of the corresponding perforation remotor from the film edge.

17. The automatic film winding device for camera according to claim 11, wherein the device further comprising other pressing means mounted on a camera body and urged by spring means so as to be capable of pressing the leading end of the film to the film winding member in the winding operation.

18. The automatic film winding device for camera according to claim 17, wherein the pressing force of the other pressing means is greater than that of the one pressing means.

19. The automatic film winding device for camera according to claim 11, wherein each of the pressing means is provided integrally with a film guide face.

20. The automatic film winding device for camera according to claim 11, wherein the protuberance is made of synthetic resin material.

21. The automatic film winding device for camera according to claim 11, wherein the protuberance is provided at a position close to the cut edge of the narrowed leading end of the film.

22. An automatic film winding device for camera of the type in which the leading end of the film is wound on a film winding member by dint of a frictional force, improvement of the device which comprising the film winding member of which the outer peripheral portion at one end is formed larger in diameter than the other outer peripheral portion, a flange formed at one end of the film winding member, a protuberance provided on the inner wall surface of the film winding chamber for slanting the plane of the narrowed leading end of the film relative to the axis of the film winding member, so that the leading end of the film advancing into the film winding chamber is guided by the protuberance, a film winding motor disposed in the film winding member, a sprocket disposed at the entrance of the film winding chamber including the film winding member, gear trains for connecting the output shaft of the motor with the film winding member and the sprocket, the peripheral speed of the film winding member being larger than that of the sprocket, and a pressing means mounted on a camera body for pressing the narrowed leading end of the film against the outer peripheral surface of the film winding member at the position where the leading end of the film is received into the film winding chamber.

23. The automatic film winding device for camera according to claim 22, wherein the device further comprising other pressing means, and wherein the pressing force of the other pressing means is greater than that of the one pressing means.

* * * * *